United States Patent
Wang et al.

(10) Patent No.: US 11,969,890 B2
(45) Date of Patent: Apr. 30, 2024

(54) CONTROL METHOD AND CONTROL SYSTEM USING THE SAME

(71) Applicant: UBTECH ROBOTICS CORP LTD, Shenzhen (CN)

(72) Inventors: Ziyi Wang, Shenzhen (CN); Guoping Yang, Shenzhen (CN); Hao Dong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 331 days.

(21) Appl. No.: 17/584,398

(22) Filed: Jan. 26, 2022

(65) Prior Publication Data

US 2022/0305643 A1 Sep. 29, 2022

Related U.S. Application Data

(63) Continuation of application No. PCT/CN2021/125037, filed on Oct. 20, 2021.

(30) Foreign Application Priority Data

Mar. 26, 2021 (CN) .......................... 202110327255.9

(51) Int. Cl.
  *B25J 9/16* (2006.01)
  *G05B 15/02* (2006.01)
  *H04L 67/125* (2022.01)

(52) U.S. Cl.
  CPC .............. *B25J 9/161* (2013.01); *G05B 15/02* (2013.01); *H04L 67/125* (2013.01)

(58) Field of Classification Search
  CPC ......... B25J 9/161; B25J 9/1628; G05B 15/02; G05B 2219/33097; H04L 67/125; H04L 69/14
  See application file for complete search history.

(56) References Cited

U.S. PATENT DOCUMENTS

2017/0259433 A1* 9/2017 Takeuchi ............... B25J 13/085
2019/0253355 A1* 8/2019 Sawada ................ G05B 19/408
(Continued)

FOREIGN PATENT DOCUMENTS

CN 106200571 A 12/2016

OTHER PUBLICATIONS

ISR for PCT/CN2021/125037.
Written opinions of ISA for PCT/CN2021/125037.

*Primary Examiner* — Kira Nguyen

(57) ABSTRACT

A control method and a control system using the same as are provided. The method includes: extracting a corresponding component data from a component data stream based on an application protocol registered by each of a plurality of applications and encapsulating a corresponding application data packet for the application in response to receiving the component data stream in a current control period; transmitting the corresponding application data packet to each of the applications; obtaining control data reported by each of the applications according to data reporting timing corresponding to the application; and generating a component control instruction for controlling each of the components according to the control data reported by each of the applications in the current control period and the application protocol registered by the application. In this manner, the orderly control of a smart devices within a limited control period can be achieved.

20 Claims, 8 Drawing Sheets

(56) References Cited

U.S. PATENT DOCUMENTS

2019/0253467 A1\* 8/2019 Toal .................... H04L 65/1086
2020/0186385 A1\* 6/2020 Yamawaki ........ H04L 12/40169

\* cited by examiner

CONTROL METHOD AND CONTROL SYSTEM USING THE SAME

CROSS REFERENCE TO RELATED APPLICATIONS

The present application is a continuation-application of International Application PCT/CN2021/125037, with an international filing date of Oct. 20, 2021, which claims foreign priority of Chinese Patent Application No. 202110327255.9, filed on Mar. 26, 2021 in the State Intellectual Property Office of China, the contents of all of which are hereby incorporated by reference.

BACKGROUND

1. Technical Field

The present disclosure relates to communication technology, and particularly to a control method and a control system using the same as well as a computer readable storage medium.

2. Description of Related Art

The control system of a robot is a system for the robot to periodically set the motors and other components at each joint of the robot according to the calculation results of the control algorithm. Generally speaking, the control of the control system is mostly a synchronous sequential process of reading the data of the components and deploying the calculation results to the components through the control algorithm. As the degree of freedom (DOF) of robots increases and the complexity of the control algorithms increases, the time-consuming of the control algorithm also increases and causes that the execution time of the control algorithm plus the transmission time of data is greater than the control cycle of the robot.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
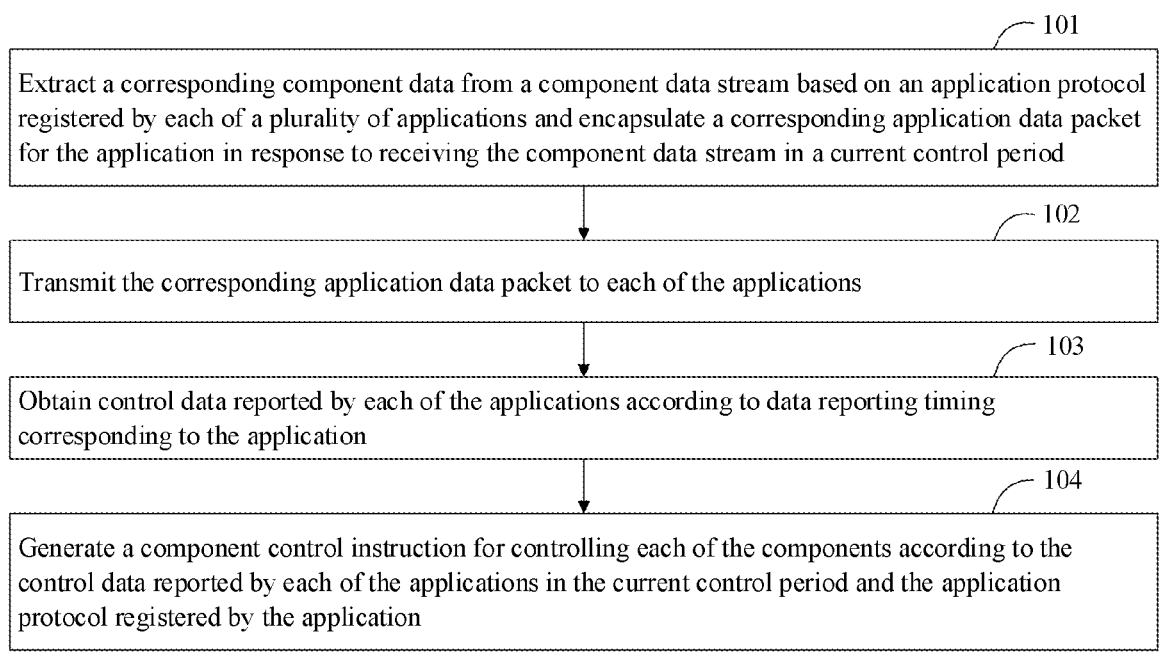
FIG. 1 is a flow chart of a control method according to an embodiment of the present disclosure.

FIG. 1 is a flow chart of a control method according to an embodiment of the present disclosure. A control method is provided. In one embodiment, the control method is a computer-implemented method executable for a processor, which may be applied to a smart device such as a robot or a vehicle. In the case that the smart device is a robot such as a humanoid robot, the robot may have a head, a torso and two legs each including a foot. The method may be implemented through a control system shown in FIG. 6, a decision center shown in FIG. 7, or a smart device shown in FIG. 8. As shown in FIG. 1, the method may include the following steps.

101: extracting a corresponding component data from a component data stream based on an application protocol registered by each of a plurality of applications and encapsulating a corresponding application data packet for the application in response to receiving the component data stream in a current control period.

In this embodiment, each application may register the application protocol adopted by itself when the robot starts up. The application protocols include monitoring protocols and return protocols. In which, the monitoring protocols are used to indicate the component that the application monitors, and the return protocols are used to indicate the component that the application controls. For example, if application A is to control the movement of the robot through the data of the obstacles obtained by sensing through a distance sensor, the monitoring protocol registered by application A indicates that the components monitored by the application are the motor of the foot of the robot and a distance sensor, and the return protocol registered by application A indicates that application A controls the motor of the foot. Generally speaking, the application protocol adopted by each application may be configured by the developer in advance according to the function of each application. After the configuration is completed, each application only needs to register the application protocol at a decision center when the robot starts, so that the decision center can know the application protocol adopted by each application.

In some embodiments, the application protocol may be represented as a correspondence between data indexes and data structures. For example, the data index value of the motor of the foot can be 1, the data index value of the motor of the waist of the robot can be 2, and the data structure corresponding to the data index value of each motor includes parameters such as the number of motors, the speed of the motors, and the position of the motors. The data index of the inertial measurement unit (IMU) can be 4, and the data structure corresponding to the data index value of the IMU includes parameters such as accelerometer data of three uni-axes: x, y and z, and gyroscopes data of three uni-axes: roll, pitch and yaw. Similarly, each of the common components of the robot, for example, distance sensors and remote controllers will be configured with their own unique data index values and the corresponding data structures. Therefore, when the application registers the application protocol, it may report the form of the data index value associated with the monitored component so as to inform the decision center which component data to read, and may report the form of the data index associated with the controlled component so as to inform the decision center which component data to write.

When the decision center reads a signal associated with the start of a control cycle, it enters the current control cycle. In the current control cycle, once the component data stream transmitted by each component of the robot is received, the decision center may extract the component data required by each application from the component data stream based on the application protocol registered by the application, and encapsulate the corresponding application data packet for each application. For example, for application A, the decision center may extract the motor data and distance sensor data of the foot from the component data stream, and encapsulate the extracted motor data and distance sensor data of the foot as the application data package of application A.

102: transmitting the corresponding application data packet to each of the applications.

In this embodiment, after encapsulating the application data packet corresponding to each application, the decision center may transmit the corresponding application data packet to each application. After receiving the application data packet transmitted by the decision center, each application may start to analyze and calculate the received application data packet based on its own preset control algorithm to generate the corresponding control data.

103: obtaining control data reported by each of the applications according to data reporting timing corresponding to the application.

In this embodiment, the execution time of the control algorithm adopted by each application is different. According to the length of the execution time of the control algorithm adopted by the applications, the applications may be divided into two types: synchronous applications and asynchronous applications. For example, if the execution time of the control algorithm used by an application is less than the cycle time of the control cycle, the application is a synchronous application; on the contrary, if the execution time of the control algorithm adopted by an application is not less than the cycle time of the control cycle, the application is an asynchronous application. It can be seen from this that within a control period, after the asynchronous application obtains the application data packet, it must not be able to generate control data again within the control period. Therefore, the robot may determine the data reporting timing corresponding to each of the applications according to the type that the application belongs to.

Generally speaking, the synchronous application may be deployed on a host device locally, or may also be deployed on the slave device connected to the host device through a high-speed bus such as PCIe (peripheral component interconnect express), while the principle is that the communication time is less than 20% of the control period. The asynchronous application is not limited by the delay and the location, and can be deployed in the host device, the PCIe slave device, or a network device.

104: generating a component control instruction for controlling each of the components according to the control data reported by each of the applications in the current control period and the application protocol registered by the application.

In this embodiment, after aggregating the control data reported by each application in the current control period, the decision center may generate the component control instruction for each component based on the control data and the component indicated by the application protocol registered by each application for controlling so as to realize the control over each component. For example, according to the application protocol registered by application A and application B, if it is determined that both application A and application B control the motor of the foot, the component control instruction for the motor of the foot may be generated based on the control data returned by application A and application B, thereby realizing the control over the motor of the foot; and according to the application protocol registered by application C, if it is determined that application C controls the motor of the waist, and the component control instruction for the motor of the waist may be generated based on the control data returned by application C, thereby realizing the control over the motor of the waist.

In some embodiments, for the applications belonging to the synchronous applications, the decision center will further perform timeout judgment on these applications, then the above-mentioned step 102 may include:

detecting whether each first application has a report timeout in a previous control period, where the first application belongs to the synchronous application; and transmitting the corresponding application data packet to each target first application, where the target first application is the first application that not has the report timeout in the previous control period.

The current control cycle is denoted as the i-th control cycle after the robot is started, and the previous control cycle is denoted as the i−1-th control cycle. It should be noted that, if the current control cycle is the first control cycle passed by after the robot is started, there is no need to perform a timeout judgment on each first application. It can be seen that i should be a positive integer greater than 1. For any first application, as long as the first application not has the report timeout in the previous control period, it may be determined as the target first application. After judging the timeout of each of the first applications, all the target first applications that have not timeout in the previous control period can be obtained by screening. The decision center may transmit the corresponding application data packet to each target first application. That is, only the first application that has not timeout in the previous control period can receive the application data packet of the current control period, while the first application that has timeout in the previous control period (i.e., the non-target first application) cannot receive the application packets in the current control period.

In some embodiments, for the application data packet corresponding to each non-target first application, its corresponding control data will be generated by the decision center. For example, assuming that application A is a synchronous application, and application A has a report timeout in the previous control period, the decision center will not transmit the application data packet of application A in the current control period to application A, and the decision center will get the component controlled by application A according to the application protocol registered by application A and generate control data for the component. That is, the control data will be generated by the decision center instead of the non-target first application. In addition, the decision center will replace the application that has the report timeout in the current control cycle to generate the control data. For example, if application A is the target first application but it has the report timeout in the current control cycle, which means that the decision center fails to receive the data reported by application A in the current control cycle. At this time, the decision center will get the component controlled by application A according to the application protocol registered by application A, and generate the control data for the component.

In some embodiments, if the decision center detects that there is an application that continuously has the report timeout for more than N times when the application data packet is received, it can be determined that the robot is abnormal, and the robot may be triggered to stop at this time. In which, the above-mentioned N may be set according to the operation state of the robot. Generally speaking, if the operation state of the robot is a stationary state, N may be set to a relatively larger value such as 5; otherwise, if the operation state of the robot is a moving state, N may be set to a relatively small value such as 3. For example, in the stationary state of the robot, if application A has the report timeout in the i-th control cycle, the continuous report timeout is recorded as 1 time. The decision center will not transmit the application data packet to application A in the i+1-th control cycle, and resume to transmit the application data packet to application A in the i+2-th control cycle. If application A has the report timeout in the i+2-th control cycle, the continuous reporting timeout is recorded as 2 times. The decision center will not transmit the application data packet to application A in the i+3-th control cycle, and resume to transmit the application data packet to application A in the i+4-th control cycle. If application A has the report timeout within the i+4-th control cycle, the continuous report timeout is recorded as 3 times, and it can be determined that the robot is abnormal and the robot can be triggered to stop at this time.

In some embodiments, the synchronization application should report the control data to the decision center within the current control period. Thus, for each target first application, the data reporting timing of the above-mentioned target first application may be determined as in a preset timeout period in the above-mentioned current control period that is after transmitting the corresponding application data packet to the above-mentioned target first application. That is, for any target first application, after the decision center transmits the application data packet to the target first application, it will start timing, and the target control data reported by the first application should be received before the timing time exceeds the timeout period. If the decision center has not received the control data reported by the target first application after the timing time exceeds the timeout period, it is considered that the target first application has the report timeout in the current control period.

In some embodiments, after transmitting the corresponding application data packets to each target first application, the decision center may transmit the corresponding application data packet to each second application, where the second application belongs to the asynchronous application. That is, when the decision center transmits the corresponding application data packet to the application, the synchronous application will be preferentially transmitted.

In some embodiments, the asynchronous application usually reports the control data to the decision center in the control period after the current control period. In which, the asynchronous applications may be further subdivided into single-cycle asynchronous applications and multi-cycle asynchronous applications. The single-cycle asynchronous application refers to the application that reports the control data in the next control cycle, and the multi-cycle asynchronous application refers to the application that reports the control data in n control cycle. For example, if an application receives the application data packet in the i-th cycle, and it reports the control data calculated based on the application data packet in the i+1-th cycle, the application is the single-cycle asynchronous application. Otherwise, if an application receives the application data packet in the i-th cycle, and it reports the control data calculated based on the application data packet in the i+n-th cycle, and n is a positive integer greater than 1, then the application is the multi-cycle asynchronous application. Therefore, for each second application, the decision center may first obtain the number of asynchronous cycles of the second application based on the execution time of the control algorithm adopted by the second application, and determine the target control cycle according to the number of asynchronous cycles. It can be known that this target control period is after the current control period. Correspondingly, it can determine the data reporting timing of the second application as after the component data stream is received in the target control period. That is, for any second application, after transmitting the application data packet to the second application, the decision center will first receive the control data reported by the second application in the target control period once entering the target control period determined based on the second application, and then perform the extraction of the component data and the encapsulation of the application data packet on the component data stream received in the target control period.

In some embodiments, considering that asynchronous applications will not block in reporting, when the decision center obtains the control data reported by an asynchronous application, it will first judge the validity of the control data. The decision center will perform subsequent processing on the control data only in the case that the control data is judged as valid, and will discard the control data in the case that the control data is judged as invalid. As an example, if the control data reported by an asynchronous application in the current control period has changed compared with the control data reported in the previous control period, the control data reported by the asynchronous application in the current control period will be considered as valid.

In some embodiments, considering that there is usually a plurality of components in the robot, and it can be known that different applications may control different components according to the application protocol registered by each application. Therefore, the above-mentioned step 104 may include:

determining the control data corresponding to each of the components according to the application protocol registered by the application;

obtaining target control data by updating based on the control data corresponding to each of the components; and generating a component control instruction for each of the components based on the target control data of the component.

That is, for any component, the decision center may determine which applications in the robot will control the component according to the return protocol registered by each application, so that the control data corresponding to the component can be known. Then, the decision center may obtain the target control data of the component by updating the control data corresponding to the component. After the above-mentioned operations are performed on each component, the target control data of each component can be obtained, and the component control instruction for each component can be generated correspondingly.

In an application scenario, for a certain component, assuming that only one application will control it, the control data reported by the application may be directly determined as the target control data.

In another application scenario, for a certain component, assuming that more than two applications will control it, that is, the component is associated with at least two sets of control data. In this case, the decision center will obtain the weights of the applications respectively corresponding to the at least two sets control data first, and then obtain the target control data by updating the at least two sets control data based on the control data corresponding to the component and the above-mentioned weights. It should be noted that, for the applications with the same registered return protocol, these applications will also inform the decision center of their respective weights when performing the protocol registration. For example, if the return protocol registered by application A and that registered by application B are the same, both of which indicate the control of the motor of the foot, then application A and application B will report their own weights while registering the protocol. As an example, the weight of application A is 0.7 and the weight of application B is 0.3, which indicate that the priority of the control data returned by application A is higher than the priority of the control data returned by application B. In this way, for the component of the motor of the foot, the target control data finally obtained by updating by the decision center will take the control data returned by application A into account to a greater extent. That is, on the basis of the control data returned by application A, a simple fine-tuning is performed on the control data returned by application A through the control data returned by application B so as to obtain the component control instruction of the motor of the foot.

Usually, for applications that have registered the same return protocol, the order of the weights from high to low is: synchronous application—single-cycle asynchronous application—multi-cycle asynchronous application. In addition, considering that the decision center may also generate control data, it is often considered that the control data generated by the decision center has the highest priority, that is, the weight of the decision center is higher than that of the application.

Figure 2:
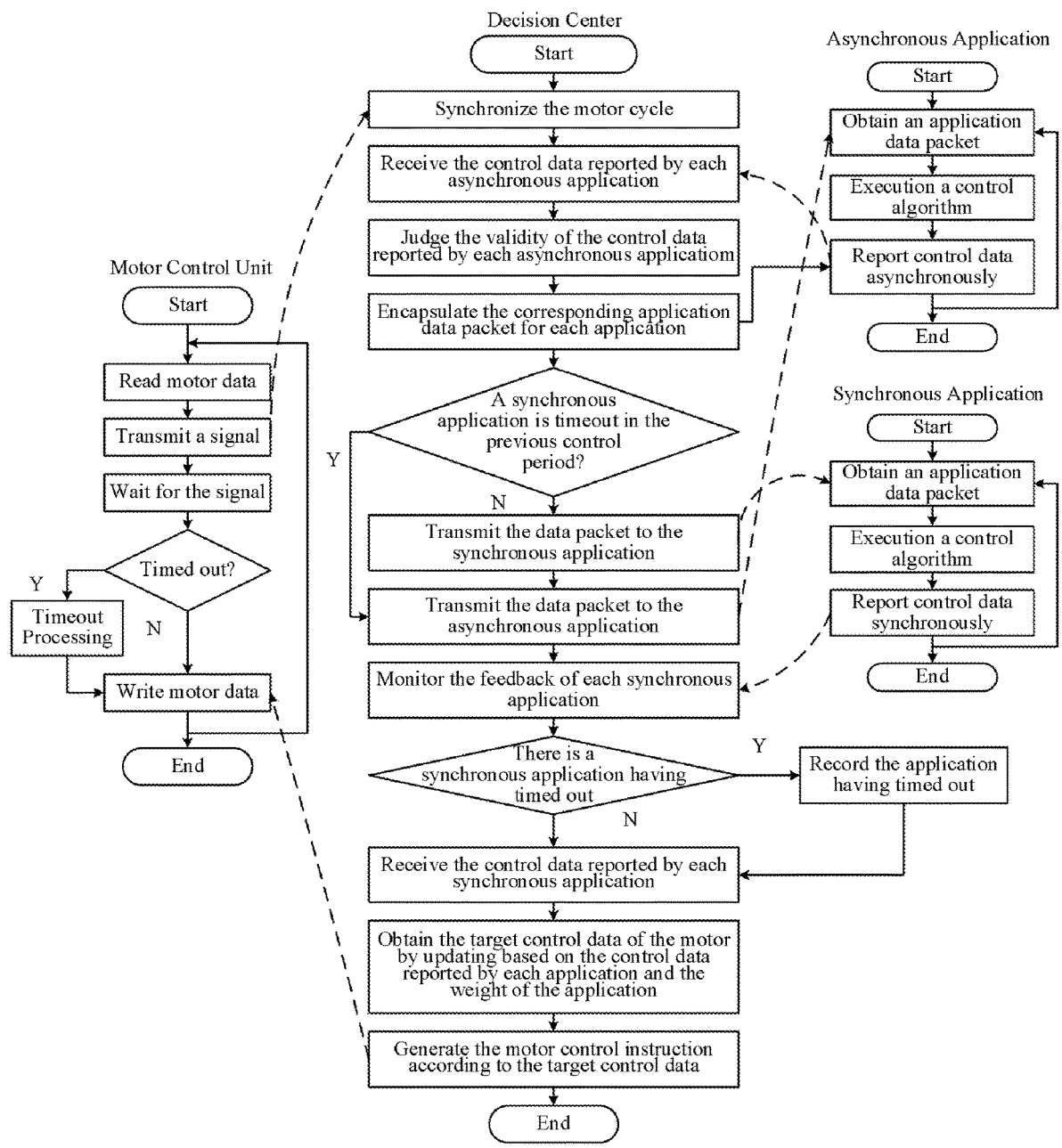
FIG. 2 is a schematic diagram of the interaction flow of the control method according to an embodiment of the present disclosure.

FIG. 2 is a schematic diagram of the interaction flow of the control method according to an embodiment of the present disclosure. As shown in FIG. 2, in some embodiments, taking the component as a motor as an example, in the interaction flow between a decision center, a motor control unit, and applications (including a synchronous application and an asynchronous application, the motor control unit is for realizing the control of the motor according to the received motor control instruction (i.e., the component control instruction for the motor). A brief introduction to the interaction of the three is as follows.

First, upon reading the motor data, the motor control unit will transmit a signal to the decision center, so that the decision center may synchronize the motor cycle, that is, enter the current control cycle. The motor control unit thus enters the state of waiting for the signal, and starts timing to judge whether the feedback from the decision center has timed out.

Second, in the current control cycle, the decision center will receive the control data reported by each asynchronous application first, and judge the validity of the data. It should be noted that, the control data reported by each asynchronous application is calculated based on the motor data of a certain historical control cycle.

Third, the decision center encapsulates the corresponding application data packet for each application that needs the motor data, and prepares to transmit the application data packet to the synchronous application first, and then transmit the application data packet to the asynchronous application. It should be noted that, if a synchronous application is timeout in the previous control period, the decision center will not transmit the application data packet to the synchronous application in the current control period to avoid the situation of losing synchronization. For the synchronous application, after receiving the application data packet in the current control period, it should also report the control data in the current control period. If it fails to report in time, it will be recorded as timeout by the decision center. For the asynchronous application, after receiving the application data packet in the current control period, it will report the control data in the subsequent control period.

Fourth, the decision center will obtain the target control data of the motor by updating based on the control data for the motor that is reported by each application in the current control cycle and the weight of the application, and generate the motor control instruction according to the target control data. The motor control instruction will be sent back to the motor control unit. At this point, the operations of the decision center in the current control cycle ends.

Finally, if the motor control instruction received by the motor control unit has not timed out, the motor data may be written according to the motor control instruction to realize the control of the motor. It should be noted that, since the motor needs to be controlled before the end of each control cycle, if the feedback from the decision center has timeout, the motor control unit will use a timeout strategy in response. The timeout strategy is related to the operation state of the robot. For example, if the robot is in the stationary state, it may continue to control the motor based on the motor control instructions of the previous control cycle. If the robot is in the stationary state, the motor control unit may place the motor in an estimated state so that the motor stops sharply or overrun.

It should be noted that, although FIG. 2 shows that the decision center first receives the control data reported by each asynchronous application and then transmits the data packet to the asynchronous application, the order of the two is not limited in practical applications. That is, it is also possible to encapsulate the data packet of each application first and transmit the corresponding data packet to the synchronous application and the asynchronous application, respectively, and then receive the control data reported by the asynchronous application. Only in rare cases, the decision center is required to receive the control data reported by the asynchronous application first, for example, for a certain asynchronous application that needs to use the control data output by the last execution of the control algorithm in the current execution of the control algorithm at this time (i.e., the control algorithm of the asynchronous application will iterate over the control data).

In order to facilitate the understanding of the control method, the three applications (i.e., the synchronous application, the single-cycle asynchronous application and the multi-cycle asynchronous application) are further explained as follows.

Figure 3:
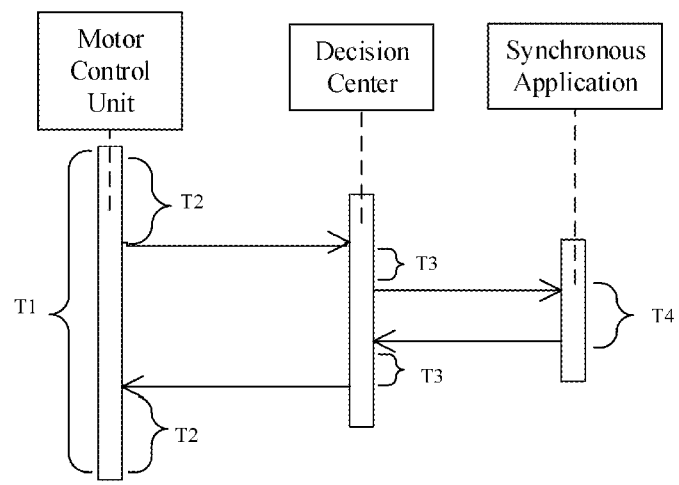
FIG. 3 is a schematic diagram of the timing of a synchronization application according to an embodiment of the present disclosure.

FIG. 3 is a schematic diagram of the timing of a synchronization application according to an embodiment of the present disclosure. As shown in FIG. 3, in the timing diagram of a synchronization application, the synchronous application refers to the application that completes a series of operations of component data reading, control algorithm calculation, calculation result return and component control within one control cycle.

As an example only, assuming that control period T1 of the robot is 1 ms, the motor control unit and the decision center are two processes that communicate through shared memory and the data read/write time T2 is 50 us, and the synchronization application is a separate process independent of the decision center. If the synchronization application and the decision center are in the same device, the two also communicate through shared memory, and time T3 for one data transmission is 50 us. If the synchronization application and the decision center are not in the same device, the two are connected through PCIe, and the transmission of 1K data is about 100 us; T4 is the execution time of the control algorithm reserved for the synchronous application, then:

$$T4=T1-2*T2-2*T3=1000-2*50-2*100=700 \text{ us}.$$

It can be seen from the timing diagram that, the synchronization application has the advantages of good synchronization performance, simple control, and timely hardware response. The control method proposed by the embodiments of the present disclosure can support parallel execution of a plurality of synchronous applications.

Figure 4:
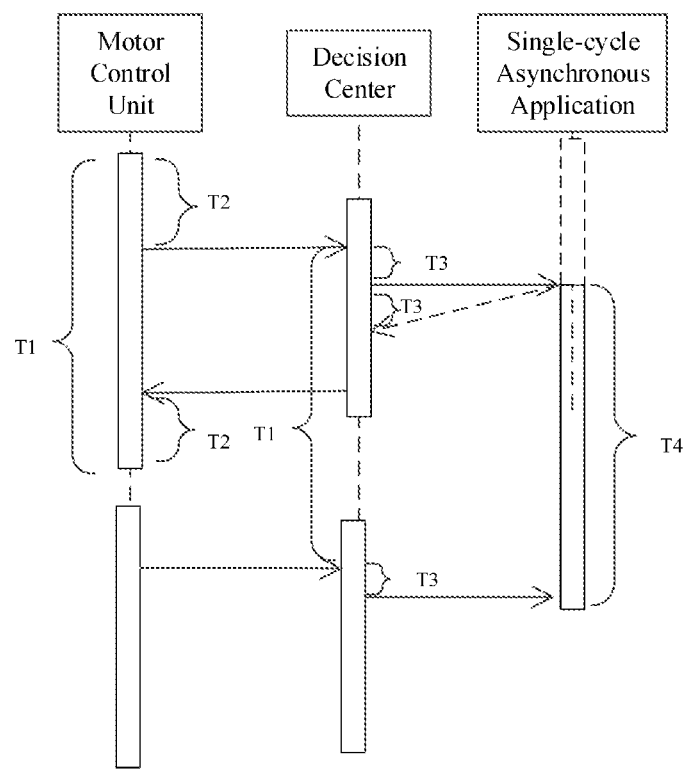
FIG. 4 is a schematic diagram of the timing of a single-cycle asynchronous application according to an embodiment of the present disclosure.

FIG. 4 is a schematic diagram of the timing of a single-cycle asynchronous application according to an embodiment of the present disclosure. As shown in FIG. 4, in the timing diagram of a single-cycle asynchronous application, the single-cycle asynchronous application refer to the application that with the help of the multi-core processing capability of the central processing unit (CPU) of the robot, one thread is responsible for reading/writing component data and another thread is responsible for controlling the calculation of the algorithm, and the algorithm thread and the communication thread are in parallel. The calculation cycle of the control algorithm can be basically the same as the control cycle of the component as long as the data transmission time is less than the calculation cycle (i.e., the execution time) of the control algorithm. In this way, the control of the component is delayed by one cycle, which has little effect on the real-time performance, but the application will gain more computing time.

For example, assuming that the control period T1 of the robot is 1 ms, and the motor control unit and the decision center are two processes communicate through shared memory, and the time T2 for one data read/write is 50 us. The single-cycle asynchronous application is a separate process independent of the decision center. If the single-cycle asynchronous application and the decision center are in the same device, the two also communicate through shared memory, and the time T3 for one data transmission is 50 us. If the synchronous application and the decision center are not in the same device, the two are connected through PCIe, and the transmission of 1K data is about 100 us. The execution time of the control algorithm reserved for the single-cycle asynchronous application is the time difference between the arrival of two sets of motor data, that is, T4=T1. In the timing diagram shown in FIG. 4, the decision center first transmits a data packet to the single-cycle asynchronous application, and then receives the control data calculated through the data packet of the previous control cycle that is fed back by the data packet of the single-cycle asynchronous application. The data flow of the single-cycle asynchronous application is briefly described as follows. The motor control unit reads the motor data to transmit to the decision center, and the decision center transmits the data packet encapsulated based on the control data to the single-cycle asynchronous application and reads the calculation result of the last control cycle of the single-cycle asynchronous application, that is, the single-cycle asynchronous application only needs to calculate the corresponding control data for the read of the decision center based on the last motor data before receiving the current motor data. For example:

at 0 us, the i-th control cycle starts, and the motor control unit reads the motor data;

at 50 us, the motor data is transmitted from the motor control unit to the decision center;

at 150 us, the decision center transmits the motor data to the single-cycle asynchronous application, and the single-cycle asynchronous application starts to calculate;

at 300 us, the decision center obtains the calculation result calculated by the single-cycle asynchronous application based on the motor data of the previous control cycle (the i−1-th control cycle);

at 350 us, the decision center returns the control instruction to the motor control unit based on the calculation result, and writes data to the motor;

waiting for the next cycle to start;

at 1000 us, the i+1-th control cycle starts, the motor control unit reads the motor data;

at 1050 us, data is transmitted from the motor control unit to the decision center;

at 1150 us, the decision center transmits the motor data to the single-cycle asynchronous application, and the single-cycle asynchronous application starts to calculate; and at 1300 us, the decision center obtains the calculation result calculated by the single-cycle asynchronous application based on the motor data (i.e., the motor data transmitted at 150 us) of the previous control cycle (i.e., the i-th control cycle).

It can be seen from this timing diagram that, the single-cycle asynchronous application can complement the synchronous application and is more flexible.

Figure 5:
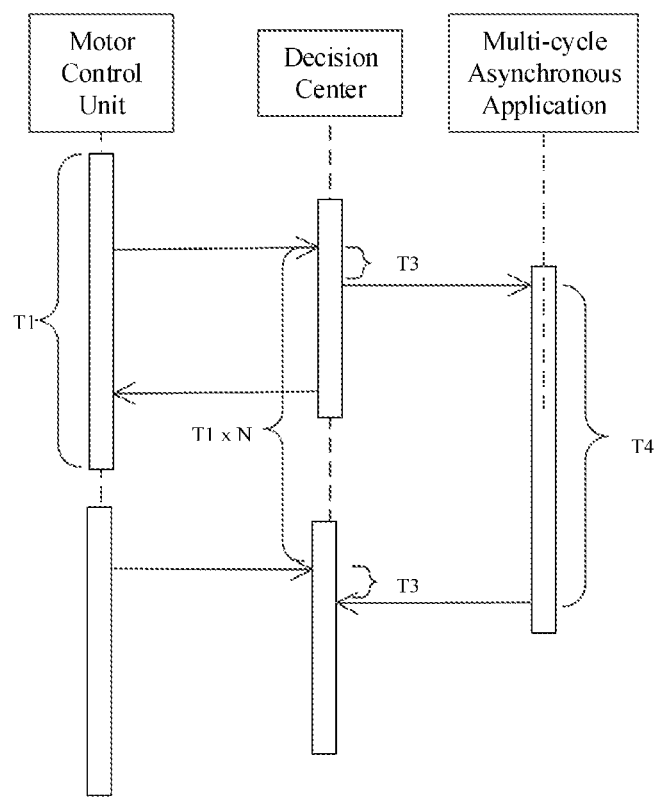
FIG. 5 is a schematic diagram of the timing of a multi-cycle asynchronous application according to an embodiment of the present disclosure.

FIG. 5 is a schematic diagram of the timing of a multi-cycle asynchronous application according to an embodiment of the present disclosure. As shown in FIG. 5, in the timing diagram of a multi-cycle asynchronous application, the multi-cycle asynchronous application is a complement to a single-cycle asynchronous application, which returns the computation result after a plurality of cycles.

For example, assuming that the control period T1 of the robot is 1 ms, and the motor control unit and the decision center are two processes communicate through shared memory, and the time T2 for one data read/write is 50 us. The single-cycle asynchronous application is a separate process independent of the decision center. If the single-cycle asynchronous application and the decision center are in the same device, the two also communicate through shared memory, and the time T3 for one data transmission is 50 us. If the synchronous application and the decision center are not in the same device, the two are connected through PCIe, and the transmission of 1K data is about 100 us. The execution time of the control algorithm reserved for the multi-cycle asynchronous application is the time difference between the arrival of multiple sets of motor data, that is, T4=N*T1.

From the timing diagram, it can be seen that the multi-cycle asynchronous application can be applied to the scenario of planning, navigation, perception data, and network data that can accept high latency or high time consumption.

As can be seen from the forgoing, through the embodiments of the present disclosure, each application in the smart device can register the application protocol according to the requirements of its own function, so that the required component data can be obtained from the component data stream in time, and the data processing efficiency of each application and the utilization efficiency of the resources of the smart device can be improved. In addition, the types of each application can also be divided based on the execution time of the control algorithm of the application, and the corresponding data reporting timing can be planned accordingly so as to provide sufficient algorithm execution time for each application, which can achieve the orderly control of the smart devices within a limited control period.

Figure 6:
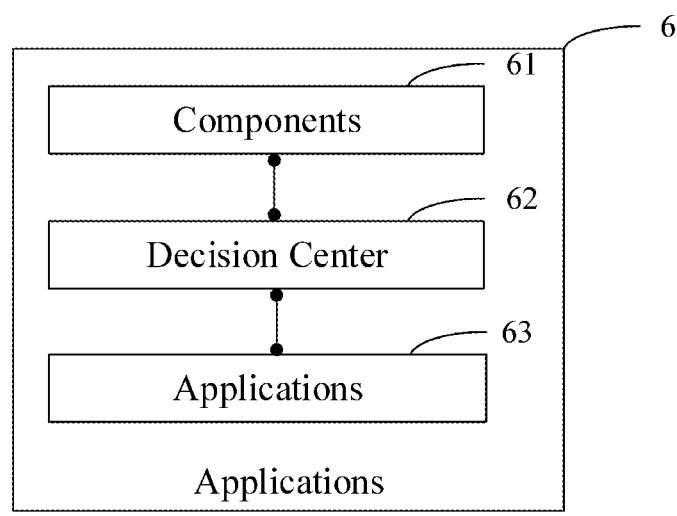
FIG. 6 is a schematic block diagram of a control system according to an embodiment of the present disclosure.
Figure 7:
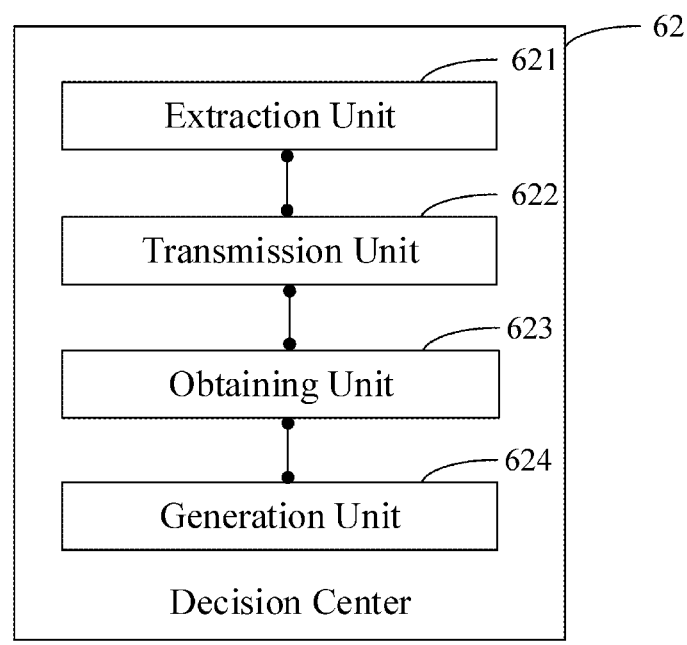
FIG. 7 is a schematic block diagram of a decision center according to an embodiment of the present disclosure.

Corresponding to the forgoing control method, the embodiments of the present disclosure provide a control system 6. FIG. 6 is a schematic block diagram of a control system according to an embodiment of the present disclosure. As shown in FIG. 6, the control system 6 is integrated in the smart device, which may include components 61, a decision center 62 and applications 63. It should be noted that, the number of the components 61 and the applications 63 may be more than one. FIG. 7 is a schematic block diagram of a decision center according to an embodiment of the present disclosure. As shown in FIG. 7, the decision center 62 may include:

an extraction unit 621 configured to extract a corresponding component data from a component data stream based on an application protocol registered by each of a plurality of applications and encapsulate a corresponding application data packet for the application in response to receiving the component data stream in a current control period, where the application protocol indicates at least a component of the smart device monitored and controlled by the corresponding application;

a transmission unit 622 configured to transmit the corresponding application data packet to each of the applications;

an obtaining unit 623 configured to obtain control data reported by each of the applications according to data reporting tuning corresponding to the application, where the control data reported by the application is generated based on the corresponding application data packet received by the application; and a generation unit 624 configured to generate a component control instruction for controlling each of the components according to the control data reported by each of the applications in the current control period and the application protocol registered by the application.

In some embodiments, the application types of the applications include a synchronous application and an asynchronous application; the decision center 62 may further include:

a determining unit configured to determine the data reporting timing corresponding to each of the applications according to the type the application belonging to, before the above-mentioned obtaining unit 623 obtains the control data reported by each of the applications according to the data reporting timing corresponding to the application.

In some embodiments, the transmission unit 622 may include:

a timeout detection subunit configured to detect whether each first application has a report timeout in a previous control period, where the first application belongs to the synchronous application; and a first transmission subunit configured to transmit the corresponding application data packet to each target first application, where the target first application is the first application not having the report timeout in the previous control period.

In some embodiments, the transmission unit 622 may further include:

a second transmission subunit configured to transmit the corresponding application data packet to each second application after transmitting the corresponding application data packet to each target first application, where the second application belongs to the asynchronous application.

In some embodiments, the above-mentioned determining unit may include:

a first determination subunit configured to determine the data reporting timing of each target first application as in a preset timeout period in the current control period after transmitting the corresponding application data packet to the target first application.

In some embodiments, the above-mentioned determining unit may include:

a period determination subunit configured to obtain an asynchronous cycle amount of each second application, and determining a target control cycle according to the asynchronous cycle amount, where the target control cycle is after the current control cycle; and a second determination subunit configured to determine the data reporting timing of the second application as after receiving the component data stream n the target control period.

In some embodiments, the above-mentioned generation unit 624 may include:

a data determination subunit configured to determine the control data corresponding to each of the components according to the application protocol registered by the application;

a data update subunit configured to obtain target control data based on the control data corresponding to each of the components; and a component control subunit configured to generate a component control instruction for each of the components based on the target control data of the component.

In some embodiments, each control data is a parameter of a component controlled by the corresponding application, and the above-mentioned data update subunit may include:

a weight obtaining subunit configured to obtain a weight of the application corresponding each of at least two of the control data in response to the component being associated with the at least two control data; and a target control data updating subunit configured to obtain the target control data based on the control data and the weight corresponding to the component.

As can be seen from the forgoing, through the embodiments of the present disclosure, each application in the smart device can register the application protocol according to the requirements of its own function, so that the required component data can be obtained from the component data stream in time, and the data processing efficiency of each application and the utilization efficiency of the resources of the smart device can be improved. In addition, the types of each application can also be divided based on the execution time of the control algorithm of the application, and the corresponding data reporting timing can be planned accordingly so as to provide sufficient algorithm execution time for each application, which can achieve the orderly control of the smart devices within a limited control period.

Figure 8:
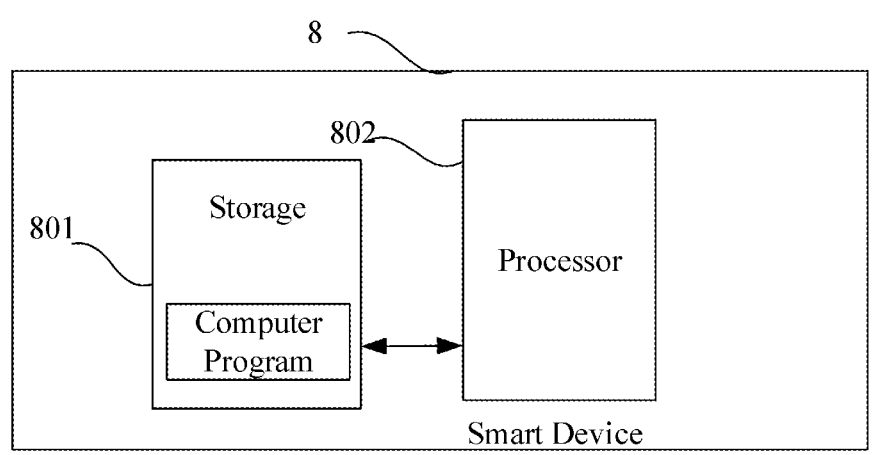
FIG. 8 is a schematic block diagram of a smart device according to an embodiment of the present disclosure.

The embodiments of the present disclosure also provide a smart device which may be a robot. FIG. 8 is a schematic block diagram of a smart device according to an embodiment of the present disclosure. As shown in FIG. 8, in this embodiment, a smart device 8 includes a storage 801, one or more processors 802 (only one is shown in FIG. 8), and a computer program stored in the storage 801 and executable on the processor(s) 802. In which, the storage 801 is for storing software programs and units, and the processor 802 performs various functional applications and data processing by executing the software programs and units stored in the storage 801. Specifically, the processor 802 implements the following steps by executing the above-mentioned computer program stored in the storage 801:

> extracting a corresponding component data from a component data stream based on an application protocol registered by each of a plurality of applications and encapsulating a corresponding application data packet for the application in response to receiving the component data stream in a current control period, where the application protocol indicates at least a component of the smart device monitored and controlled by the corresponding application;
>
> transmitting the corresponding application data packet to each of the applications;
>
> obtaining control data reported by each of the applications according to data reporting timing corresponding to the application, where the control data reported by the application is generated based on the corresponding application data packet received by the application; and
>
> generating a component control instruction for controlling each of the components according to the control data reported by each of the applications in the current control period and the application protocol registered by the application.

Assuming that the forgoing is the first possible implementation manner, in the second possible implementation manner provided based on the first possible implementation manner, types of the applications include a synchronous application and an asynchronous application. Before the obtaining the control data reported by each of the applications according to the data reporting timing corresponding to the application, the processor 802 further performs the following steps by executing the above-mentioned computer program stored in the memory 801:

> determining the data reporting timing corresponding to each of the applications according to the type the application belonging to.

In the third possible implementation manner provided on the basis of the above-mentioned second possible implementation manner, the transmitting the corresponding application data packet to each of the applications includes:

> detecting whether each first application has a report timeout in a previous control period, where the first application belongs to the synchronous application; and
> transmitting the corresponding application data packet to each target first application, where the target first application is the first application not having the report timeout in the previous control period.

In the fourth possible implementation manner provided on the basis of the above-mentioned third possible implementation manner, the he transmitting the corresponding application data packets to each of the applications further includes:

> transmitting the corresponding application data packet to each second application after transmitting the corresponding application data packet to each target first application, where the second application belongs to the asynchronous application.

In the fifth possible implementation manner provided on the basis of the above-mentioned third possible implementation manner, the determining the data reporting timing corresponding to each of the applications according to the type the application belonging to includes:

> determining the data reporting timing of each target first application as in a preset timeout period in the current control period after transmitting the corresponding application data packet to the target first application.

In the sixth possible implementation manner provided on the basis of the above-mentioned fourth possible implementation manner, the the determining the data reporting timing corresponding to each of the applications according to the type the application belonging to includes:

> obtaining an asynchronous cycle amount of each second application, and determining a target control cycle according to the asynchronous cycle amount, where the target control cycle is after the current control cycle; and
>
> determining the data reporting timing of the second application as after receiving the component data stream n the target control period.

In the seventh possible implementation manner provided on the basis of the above-mentioned first possible implementation manner, the generating the component control instruction for controlling each of the components according to the control data reported by each of the applications in the current control period and the application protocol registered by the application includes:

> determining the control data corresponding to each of the components according to the application protocol registered by the application;
> obtaining target control data based on the control data corresponding to each of the components; and
> generating a component control instruction for each of the components based on the target control data of the component.

In the eighth possible implementation manner provided on the basis of the above seventh possible implementation manner, each control data is a parameter of the component controlled by the corresponding application, and the obtaining the target control data based on the control data corresponding to each of the components includes:

> obtaining a weight of the application corresponding each of at least two of the control data in response to the component being associated with the at least two control data; and
> obtaining the target control data based on the control data and the weight corresponding to the component.

It should be comprehended that, in this embodiment, the processor 802 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 801 can include read only memory and random access memory and provides instructions and data to the processor 802. A portion or the entirety of the storage 801 can also include a non-volatile random access memory. For example, the storage 801 can also store information of the device type.

As can be seen from the forgoing, through the embodiments of the present disclosure, each application in the smart device can register the application protocol according to the requirements of its own function, so that the required component data can be obtained from the component data stream in time, and the data processing efficiency of each application and the utilization efficiency of the resources of the smart device can be improved. In addition, the types of each application can also be divided based on the execution time of the control algorithm of the application, and the corresponding data reporting timing can be planned accordingly so as to provide sufficient algorithm execution time for each application, which can achieve the orderly control of the smart devices within a limited control period.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the above-mentioned system may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of external device software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed system and method may be implemented in other manners. For example, the above-mentioned system embodiment is merely exemplary. For example, the division of the above-mentioned modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The above-mentioned units described as separate components may or may not be physically separated. The components represented as units may or may not be physical units, that is, may be located in one place or be distributed to multiple network units. Some or all of the units may be selected according to actual needs to achieve the objectives of this embodiment.

When the above-mentioned integrated unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented control method for a smart device, comprising:
  extracting a corresponding component data from a component data stream based on an application protocol registered by each of a plurality of applications and encapsulating a corresponding application data packet for the application in response to receiving the component data stream in a current control period, wherein the application protocol indicates at least a component of the smart device monitored and controlled by the corresponding application;

transmitting the corresponding application data packet to each of the applications;

obtaining control data reported by each of the applications according to data reporting timing corresponding to the application, wherein the control data reported by the application is generated based on the corresponding application data packet received by the application; and generating a component control instruction for controlling each of the components according to the control data reported by each of the applications in the current control period and the application protocol registered by the application.

2. The method of claim 1, wherein types of the applications include a synchronous application and an asynchronous application; before the obtaining the control data reported by each of the applications according to the data reporting timing corresponding to the application, the method further comprises:

determining the data reporting timing corresponding to each of the applications according to the type the application belonging to.

3. The method of claim 2, wherein the transmitting the corresponding application data packet to each of the applications comprises:

detecting whether each first application has a report timeout in a previous control period, wherein the first application belongs to the synchronous application; and transmitting the corresponding application data packet to each target first application, wherein the target first application is the first application not having the report timeout in the previous control period.

4. The method of claim 3, wherein the transmitting the corresponding application data packet to each of the applications further comprises:

transmitting the corresponding application data packet to each second application after transmitting the corresponding application data packet to each target first application, wherein the second application belongs to the asynchronous application.

5. The method of claim 4, wherein the determining the data reporting timing corresponding to each of the applications according to the type the application belonging to comprises:

obtaining an asynchronous cycle amount of each second application, and determining a target control cycle according to the asynchronous cycle amount, wherein the target control cycle is after the current control cycle; and determining the data reporting timing of the second application as after receiving the component data stream n the target control period.

6. The method of claim 3, wherein the determining the data reporting timing corresponding to each of the applications according to the type the application belonging to comprises:

determining the data reporting timing of each target first application as in a preset timeout period in the current control period after transmitting the corresponding application data packet to the target first application.

7. The method of claim 1, wherein the generating the component control instruction for controlling each of the components according to the control data reported by each of the applications in the current control period and the application protocol registered by the application comprises:

determining the control data corresponding to each of the components according to the application protocol registered by the application;

obtaining target control data based on the control data corresponding to each of the components; and generating a component control instruction for each of the components based on the target control data of the component.

8. The method of claim 7, wherein the obtaining the target control data based on the control data corresponding to each of the components comprises:

obtaining a weight of the application corresponding each of at least two of the control data in response to the component being associated with the at least two control data; and obtaining the target control data based on the control data and the weight corresponding to the component.

9. A control system for a smart device, wherein the system comprises a component, an application, and a decision center; wherein the decision center comprises:

a processor;

a memory coupled to the processor; and one or more computer programs stored in the memory and executable on the processor;

wherein, the one or more computer programs comprise:

instructions for extracting a corresponding component data from a component data stream based on an application protocol registered by each of a plurality of applications and encapsulating a corresponding application data packet for the application in response to receiving the component data stream in a current control period, wherein the application protocol indicates at least a component of the smart device monitored and controlled by the corresponding application;

instructions for transmitting the corresponding application data packet to each of the applications;

instructions for obtaining control data reported by each of the applications according to data reporting timing corresponding to the application, wherein the control data reported by the application is generated based on the corresponding application data packet received by the application; and instructions for generating a component control instruction for controlling each of the components according to the control data reported by each of the applications in the current control period and the application protocol registered by the application.

10. The system of claim 9, wherein types of the applications include a synchronous application and an asynchronous application; the one or more computer programs further comprise:

instructions for determining the data reporting timing corresponding to each of the applications according to the type the application belonging to.

11. The system of claim 10, wherein the instructions for transmitting the corresponding application data packet to each of the applications comprise;

instructions for detecting whether each first application has a report timeout in a previous control period, wherein the first application belongs to the synchronous application; and instructions for transmitting the corresponding application data packet to each target first application, wherein the target first application is the first application not having the report timeout in the previous control period.

12. The system of claim 11, wherein the instructions for transmitting the corresponding application data packet to each of the applications further comprise:

instructions for transmitting the corresponding application data packet to each second application after transmitting the corresponding application data packet to each target first application, wherein the second application belongs to the asynchronous application.

13. The system of claim 12, wherein the instructions for determining the data reporting timing corresponding to each of the applications according to the type the application belonging to comprise:
- instructions for obtaining an asynchronous cycle amount of each second application, and determining a target control cycle according to the asynchronous cycle amount, wherein the target control cycle is after the current control cycle; and
- instructions for determining the data reporting timing of the second application as after receiving the component data stream n the target control period.

14. The system of claim 11, wherein the instructions for determining the data reporting timing corresponding to each of the applications according to the type the application belonging to comprise:
- instructions for determining the data reporting timing of each target first application as in a preset timeout period in the current control period after transmitting the corresponding application data packet to the target first application.

15. The system of claim 9, wherein the instructions for generating the component control instruction for controlling each of the components according to the control data reported by each of the applications in the current control period and the application protocol registered by the application comprise:
- instructions for determining the control data corresponding to each of the components according to the application protocol registered by the application;
- instructions for obtaining target control data based on the control data corresponding to each of the components; and
- instructions for generating a component control instruction for each of the components based on the target control data of the component.

16. The system of claim 15, wherein the instructions for obtaining the target control data based on the control data corresponding to each of the components comprise;
- instructions for obtaining a weight of the application corresponding each of at least two of the control data in response to the component being associated with the at least two control data; and
- instructions for obtaining the target control data based on the control data and the weight corresponding to the component.

17. A non-transitory computer readable storage medium for storing one or more computer programs, wherein the one or more computer programs comprise:
- instructions for extracting a corresponding component data from a component data stream based on an application protocol registered by each of a plurality of applications and encapsulating a corresponding application data packet for the application in response to receiving the component data stream in a current control period, wherein the application protocol indicates at least a component of a smart device monitored and controlled by the corresponding application;
- instructions for transmitting the corresponding application data packet to each of the applications;
- instructions for obtaining control data reported by each of the applications according to data reporting timing corresponding to the application, wherein the control data reported by the application is generated based on the corresponding application data packet received by the application; and
- instructions for generating a component control instruction for controlling each of the components according to the control data reported by each of the applications in the current control period and the application protocol registered by the application.

18. The storage medium of claim 17, wherein types of the applications include a synchronous application and an asynchronous application; the one or more computer programs further comprise:
- instructions for determining the data reporting timing corresponding to each of the applications according to the type the application belonging to.

19. The storage medium of claim 18, wherein the instructions for transmitting the corresponding application data packet to each of the applications comprise:
- instructions for detecting whether each first application has a report timeout in a previous control period, wherein the first application belongs to the synchronous application; and
- instructions for transmitting the corresponding application data packet to each target first application, wherein the target first application is the first application not having the report timeout in the previous control period.

20. The storage medium of claim 19, wherein the instructions for transmitting the corresponding application data packet to each of the applications further comprise:
- instructions for transmitting the corresponding application data packet to each second application after transmitting the corresponding application data packet to each target first application, wherein the second application belongs to the asynchronous application.

* * * * *